Patented May 27, 1947

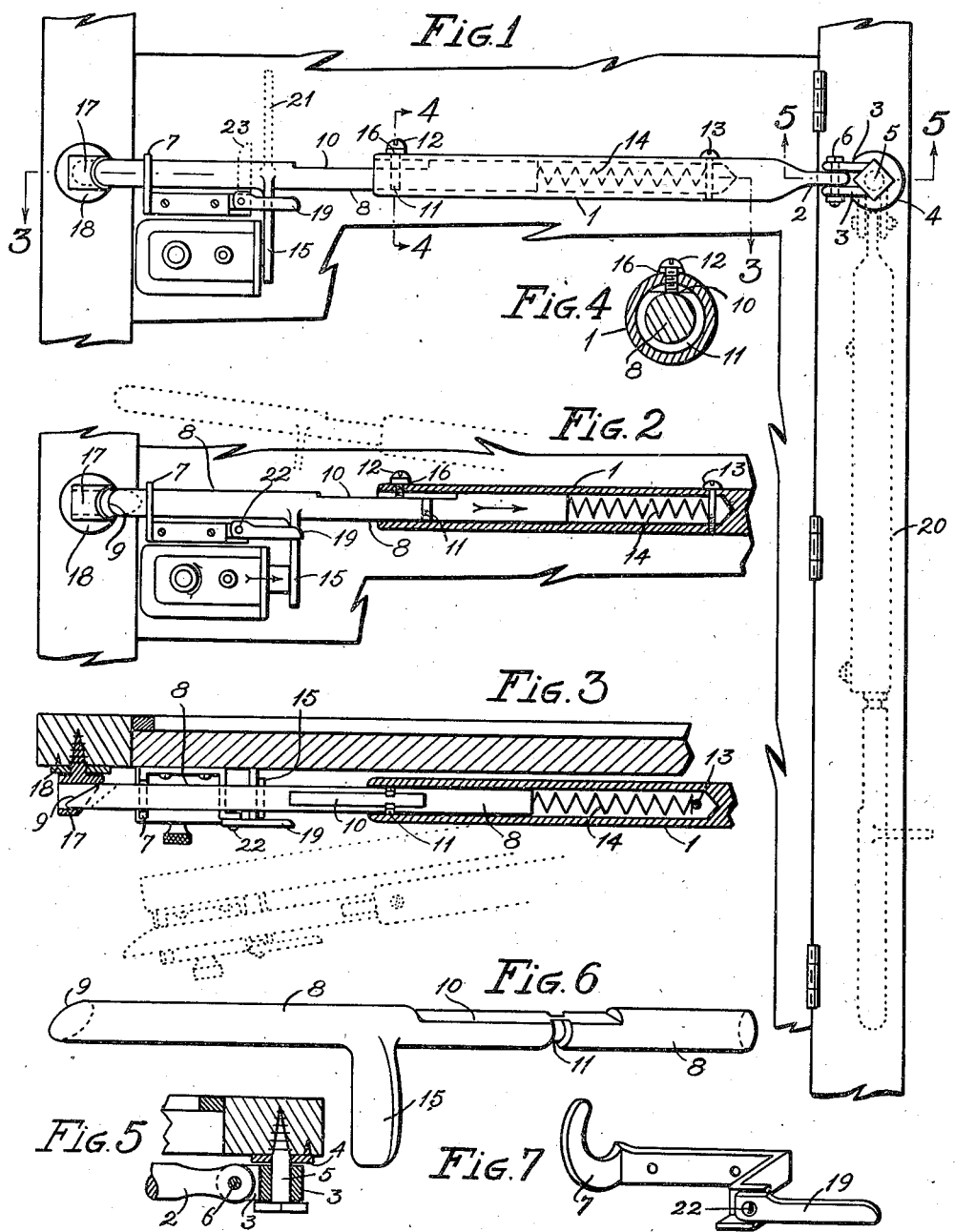

2,421,275

UNITED STATES PATENT OFFICE 2,421,275

METALLIC SAFETY BAR FOR DOORS

Leandro Garcia Lopez, Habana, Cuba

Application February 17, 1945, Serial No. 578,405
In Cuba March 14, 1944

2 Claims. (Cl. 292—259)

This invention relates to metallic safety bars for doors, and it has for its object to provide an improvement in such kind of bars, whereby the bar for securing a door is associated with the non-spring-projected bolt of a lock arranged in an inverted horizontal position so that the bar will follow the movement of the lock bolt when the lock is operated from the outside by a key or from the inside by the lock knob, whereupon my device furnishes an effective protection against violation of the door from the outside.

A further advantage of my improved bar is that it can be placed in operative position from the inside of the room and used just as an ordinary bar, independently of the lock.

Reference is had to the figures of the accompanying drawing, of which:

Fig. 1 is a partial view of the safety bar embodying my invention applied to a door, the swung out or vertical position of the bar being shown by dotted lines.

Fig. 2 is a partial view, partly broken away, of the bar in its unlocking position as actuated by the door lock.

Fig. 3 is a partial cross-sectional view on line 3—3 of Fig. 1, showing the bar in its locking position, the dotted lines showing the bar and door when the door is in a partially open position.

Fig. 4 is a vertical section view of the bar on line 4—4 of Fig. 1.

Fig. 5 is a partial vertical view on line 5—5 of Fig. 1.

Fig. 6 is a perspective view of the safety bar bolt.

Fig. 7 is a perspective view of the bracket for the bar bolt, and its safety handle.

As illustrated in the drawings, the improvement of this invention consists in a partly tubular metallic member 1, flattened at its bored end 2 which is connected by means of a joint permitting its movement in any direction, with the jamb to which the door is hinged. Said joint in the special case shown comprises a screw 6 which passes across said bore of end 2 of the said partly tubular member and across threaded bores formed in the upper and lower branches of a semi-circular forked member 3 at its reduced portion and is secured thereto by a nut and which is provided at its end with a screw 5 by means of which said forked member 3 is secured to the jamb to which the door is hinged, through a washer 4 secured to the door frame by means of a pin with which said washer is provided, so as to prevent said forked member 3 from frictioning against the door frame upon said member rotating on screw 5.

Said tubular member 1 is provided at its top portion with two threaded bores one of which is in the proximity of the free end of the tubular member, and through said bores pass screws 12 and 13, said screw 13 being adapted to serve as a support and a stop interiorly of tubular member 1 for a coil spring 14 shown in dotted lines in Fig. 1. For the sake of safety, said screw 12 is provided with a pressure washer 16.

As has already been stated, the connection of the end 2 of the tubular member 1 with the forked member 3 permits the swinging of the tubular member 1 horizontally or, when so desired, vertically as indicated in dotted lines 20 in Fig. 1.

Within the free end of tubular member 1 is partially inserted a rod 8 provided at its lower portion with a projection 15 of sufficient length and width to be in alignment with the usual bolt of a lock disposed in an inverted horizontal position and to prevent the sliding out of the bolt of the lock, said projection 15 being adapted to move with the lock bolt.

Said rod 8 is slidable forward and backward within the tubular member 1 against the elastic tension of a spring 14 supported interiorly of the tubular member 1 by the screw 13. Said rod 8 has at its upper portion a plane face 10 and circumferentially around the bar intermediate the ends of the plane face a circular cut 11, said plane face being adapted to limit the run of rod 8 longitudinally within the tubular member 1 upon its end striking the screw 12 and to prevent the projection 15 from moving and thereby causing the projection 15 to slide out of the bar. Said circular cut serves to permit the rod to be turned through a certain range in order to allow disengagement of the bar from the lock when it be desired to use the safety bar independently of the lock, as is indicated in dotted lines in Fig. 1 which shows the position in which the projection 15 would remain when raised.

The free end of the rod 8 presents a diagonal face 9 (Fig. 2) which in the horizontal or operative position of the safety bar is adapted to be automatically inserted upon the door being shut into a keeper 17 which is preferably secured to a threaded bolt adapted to be screwed into the door frame through a washer 18 secured to the frame by means of a pin with which it is provided.

To hold the safety bar in horizontal position in opening or closing the door, there is provided a semi-circular square-shaped bracket 7 which has at its other end a square bent end which is provided with a handle 19 rotatable on a shaft 22 for protecting the projection 15 in its locking position, and as indicated by dotted lines in Fig. 1, said handle may be swung to permit the projection 15 to be raised, said bracket 7 being suitably secured on the door.

To place the safety bar in operative position, assuming it is in vertical position as indicated in dotted lines in Fig. 1, the door is opened and the bar is swung up to catch in the bracket 7, the projection 15 being lowered enough to align with the bolt of the inverted lock. Upon the door being closed, the free end of the rod 8, which acts as a bolt, will be inserted in the member 17 against the elastic tension of spring 14 placed within tubular member 1, the safety bar thus remaining in locking position and ready to be operated from the outside by a key or from the inside by the lock knob.

When it is desired to bar the door from the inside, independently of the lock, it will be sufficient to raise the projection 15 to the position indicated by dotted lines in Fig. 1 and as the door is shut, the free end of rod 8 will engage the member 17. It will be obvious that the safety bar can be disengaged from the member 17 by simply causing the rod 8 to move backward against the action of spring 14.

My device may be used with single or double doors and with any kind of lock, and while the drawings illustrate the safety bar adapted to operate in horizontal position, the same may equally well be disposed in any other position as its connection with the jamb permits its swinging in any direction.

What I claim is:

1. A metallic safety bar for doors, comprising a partly tubular member having at one bored end thereof means for connection with the door frame, whereby the bar is permitted to move in any direction, said means comprising a screw which passes through the bored end of said tubular member and through threaded bores formed in the upper and lower branches of a semi-circular forked member secured as by a screw to the jamb to which the door is hinged, said member having inserted in its other end one end of a rod, said rod having integrally secured to its lower portion a projection adapted to cooperate with the bolt of a lock arranged in an inverted horizontal position, so that said projection and consequently said rod will move with the lock bolt.

2. A metallic safety bar for doors, comprising a partly tubular member having at one end thereof means for connection with the door frame whereby the bar is permitted to move in any direction, said means comprising a semi-circular forked member bored at both ends through which bores a screw is secured by a nut and said forked member having a bore at its end through which passes a screw which is screwed on the door frame to which the door is hinged, through a washer fixed to the door frame by means of a pin with which it is provided, said partly tubular member having at its upper portion two bores, one intermediate the ends of the tubular member and another in the proximity of the free end thereof, screws inserted in said bores, a coil spring positioned within the partly tubular member and secured at one end to one of said screws, said partly tubular member having its other end connected with a portion of a rod carrying a projection adapted to cooperate with the bolt of a lock arranged in an inverted horizontal position and having at its upper portion a plane face and intermediate the ends of the plane face a circular cut, said upper plane face serving to limit the movement of said rod within said bar, and said circular cut serving to permit the bar to be turned through a certain range in order to allow disengagement of the bar from the lock, and said rod having at its free end a diagonal face adapted to be automatically inserted upon the door being closed into a keeper secured to the door frame, and a bracket adapted to support the safety bar in locking position, said bracket having a handle for preventing displacement of said lever, and said bracket being suitably secured to the door.

LEANDRO GARCIA LOPEZ.

REFERENCES CITED

The following references are of record in the file of this patent:

UNITED STATES PATENTS

| Number | Name | Date |
| --- | --- | --- |
| 698,326 | Schwab | Apr. 22, 1902 |
| 924,277 | Saphier | June 8, 1909 |
| 2,163,206 | Lopez | June 20, 1939 |